US007657909B1

(12) United States Patent
Nagasaka et al.

(10) Patent No.: US 7,657,909 B1
(45) Date of Patent: *Feb. 2, 2010

(54) INFORMATION RECEIVING APPARATUS AND METHOD FOR RECEIVING HEADLINE INFORMATION

(75) Inventors: Mitsuru Nagasaka, Kanagawa (JP); Tomoko Oyabu, Kanagawa (JP); Aki Koyabu, Tokyo (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 451 days.

This patent is subject to a terminal disclaimer.

(21) Appl. No.: 09/613,067

(22) Filed: Jul. 10, 2000

(30) Foreign Application Priority Data

Jul. 12, 1999 (JP) ................................. 11-197769

(51) Int. Cl.
*G06F 3/00* (2006.01)
*H04N 5/445* (2006.01)
(52) U.S. Cl. .......................................... 725/53; 725/46
(58) Field of Classification Search .................... 725/46, 725/53
See application file for complete search history.

(56) References Cited

U.S. PATENT DOCUMENTS

| 5,671,411 | A | * | 9/1997 | Watts et al. ..................... 725/43 |
| 5,793,438 | A | * | 8/1998 | Bedard .......................... 725/43 |
| 5,977,964 | A | * | 11/1999 | Williams et al. ............. 345/721 |
| 6,005,631 | A | * | 12/1999 | Anderson et al. .............. 725/53 |
| 2003/0005445 | A1 | * | 1/2003 | Schein et al. .................. 725/51 |
| 2003/0014753 | A1 | * | 1/2003 | Beach et al. ................... 725/53 |
| 2003/0056216 | A1 | * | 3/2003 | Wugofski et al. ............. 725/46 |
| 2005/0278741 | A1 | * | 12/2005 | Robarts et al. ................ 725/46 |

FOREIGN PATENT DOCUMENTS

| JP | 10 162027 | 6/1998 |
| JP | 11 8810 | 1/1999 |
| JP | 11 164276 | 8/1999 |

OTHER PUBLICATIONS

Yuichi Yagawa et al., "TV Program Planning Agent using Analysis Method of User's Taste", Institute of Electronics, Information and Communication Engineers, Dec. 1, 1998, vol. 98 No. 437, p. 9-16.

* cited by examiner

*Primary Examiner*—Hoang-Vu A Nguyen-Ba
(74) *Attorney, Agent, or Firm*—Frommer Lawrence & Haug LLP; William S. Frommer; Thomas F. Presson (57) ABSTRACT

An information receiving apparatus for receiving the EPG data related to broadcast program has a memory in which user preference information is stored in advance. The EPG data is regularly transmitted from predetermined broadcast station to update the EPG data stored in the information receiving apparatus. When the information receiving apparatus detects the reception of updated EPG data, the information receiving apparatus starts to search the updated EPG data in order to find out the EPG data coincided with the user preference information among updated EPG data. Thereby an user is able to know favorite broadcast programs without re-entering user preference information when the EPG data is updated. If necessary, thus searched favorite broadcast program is recorded on a recording medium by automatically setting a recording timer of the information receiving apparatus.

13 Claims, 8 Drawing Sheets

| PROGRAM ID | PROGRAM ID DATA (CODE) |
|---|---|
| CHANNEL | CHANNEL DATA (CODE) |
| STATION | TEXT DATA |
| START TIME | TIME DATA |
| LENGTH (END TIME) | TIME DATA |
| TITLE | TEXT DATA |
| SUB-TITLE | TEXT DATA |
| CONTENTS | TEXT DATA |
| GENRE | GENRE DATA (CODE) |

| PATTERN | NORMAL | YEAR END | GO OUT | | | | ~P1 |

| | | | | | | | |
|---|---|---|---|---|---|---|---|
| PATTERN | NORMAL | YEAR END | GO OUT | | | | |
| GENRE | | | | | | | |
| PERSONALITY | | | | | | | |
| KEYWORD | | | | | | | |
| WEEK | MON | TUE | WED | THU | FRI | SAT | SUN |
| TIME | MORN | NOON | NIGHT | MIDNIGHT | | | |
| ICON | ST | BL | MU | WE | NE | RE | NP | E |
| CHANNEL | | | | | | | |

FIG. 6

| | | | | |
|---|---|---|---|---|
| PATTERN | NORMAL | YEAR END | GO OUT | ~P1 |
| GENRE | DRAMA | | | |
| PERSONALITY | | | | |
| KEYWORD | | | | |
| WEEK | MON TUE WED THU FRI SAT SUN | | | |
| TIME | MORN NOON NIGHT MIDNIGHT | | | |
| ICON | ST BL MU WE NE RE NP E | | | |
| CHANNEL | ALL | | | |

FIG. 7

| USER REGISTRATION NO.1 | |
|---|---|
| REGISTRATION PATTERN IDENTIFIER | 000 |
| REGISTRATION PATTERN NAME | NORMAL |
| CHANNEL | ALL |
| EPG TIME | NIGHT |
| EPG GENRE | DRAMA |
| EPG KEYWORD | NONE |
| PERSONALITY | NONE |

FIG. 8

FAVORITE PROGRAM TABLE — P2

| FEB. 17 WED. | NIGHT | 21:00 CH-7 DREAM OF ANGEL | DRAMA |
| FEB. 17 WED. | NIGHT | 21:00 CH-4 DREAM OF DEVIL | DRAMA |
| FEB. 18 THU. | NIGHT | 20:00 CH-7 LOVE AFFAIRS | DRAMA |
| FEB. 20 SAT. | NIGHT | 19:30 CH-9 COMBAT | DRAMA |

INFORMATION RECEIVING APPARATUS AND METHOD FOR RECEIVING HEADLINE INFORMATION

BACKGROUND OF THE INVENTION

1. Field of the Invention

This invention relates to an information receiving apparatus and the method. The invention may be used to a receiver and the receiving method that receives the broadcast signal transmitted from a broadcast station to display on a monitor an image related to the received broadcast signal.

2. Description of the Related Art

Generally, a broadcast station gives a broadcast service by using an analog type broadcast signal transferred on a grand wave, and the broadcast station transfers own broadcast program within a predetermined frequency band that is assigned to the broadcast station itself.

A broadcast receiver (is called as IRD: Integrated Receiver Decoder) that is located in a viewer's home selects a desired broadcast program on a desired channel from a plurality of programs on a plurality of channels corresponding to the channel selecting operation, and then the receiver decodes the selected broadcast program on the selected channel to display on a monitor.

By the way, in the analog type ground wave broadcast system, it is proposed that predetermined one of broadcast stations delivers electronic broadcast program guide information (such as broadcast program data table) for all broadcast stations. This electronic broadcast program guide information is called as an EPG (Electronic Program Guide) data and delivered regularly once a week or a month, for example. This EPG data includes a title of a broadcast program, a channel number for the broadcast program, a broadcast time of the broadcast program and explanation of the broadcast program and so on.

The viewer (listener) is able to decide favorite one of broadcast programs to watch based on the EPG (Electronic Program Guide) information for broadcast programs displayed on the display screen of the monitor.

In this case, the IRD receiver regularly receives this EPG data transmitted from the predetermined broadcast station, and stores thus received EPG data in a memory of the IRD receiver. Thus memorized EPG data is read out from the memory by the operation of the viewer (listener) and is displayed on the display screen of the monitor.

The viewer (listener) checks or searches the displayed EPG data on the display screen and decides one or more of the broadcast program to watch.

By the way, as the EPG data contains a plenty of broadcast program information of various broadcast stations, the display screen of the monitor for the IRD receiver can not display all of these EPG data at a time because of the limited size of the display screen of the monitor.

Accordingly, the viewer (listener) has to scroll or change the displayed image of the EPG data in order to find out favorite broadcast program among various broadcast programs. This scrolling operation or changing the displayed image operation is very complex and tiresome to the viewer (listener).

In order to avoid such complex operation upon finding the favorite broadcast program, a keyword search processing is proposed to search the favorite broadcast program information from a plenty of the broadcast information that includes the EPG data by setting a search condition and to display the result of searching on a monitor.

In this case, the IRD receiver executes the search processing to the EPG data stored in the memory, so that the viewer (listener) has to set keywords again every time when the EPG data is updated once a week, for example. This keyword setting operation is also complex and tiresome to the viewer (listener).

Further the conventional IRD receiver can only set a single search key such as "Drama" or "Movie" and the search result tends to include relatively large number of broadcast programs hit by the search processing using a single search key. In this case, the viewer (listener) still has to find favorite programs while scrolling search result image displayed on the display screen of the monitor.

SUMMARY OF THE INVENTION

Accordingly, it is a primary object of the present invention to propose a new information receiving apparatus and method therefore that are capable of saving labor in searching particular information.

According to the present invention, an information receiving apparatus for receiving headline information related to an information comprises memory means for storing user preference information, means for detecting reception of a plurality of headline information related to an information and means for searching, based on the user preference information stored in the memory means, headline information coincided with the user preference information among received headline information at the time when the reception of the plurality of headline information is detected by the detecting means.

Preferably the information receiving apparatus of this invention further comprises display means for displaying the headline information searched by the searching means.

In the other case, the information receiving apparatus further comprises recording means for recording the information related to the headline information searched by the searching means. In the information receiving apparatus of this invention, the user preference information includes a plurality of preference items.

Further in the information receiving apparatus of the present invention, the information is broadcast program transmitted from broadcast stations.

In the another aspect of the present invention, a method for receiving headline information related to an information includes steps for storing user preference information, detecting reception of a plurality of headline information related to an information and searching, based on the user preference information stored at the storing step, headline information coincided with the user preference information among received headline information at the time when the reception of the plurality of headline information is detected at the detecting step.

The method of this invention further includes step for displaying the headline information searched at the searching step.

If necessary the method may includes step for automatically recording the information related to the headline information searched at the searching step. In the method of this invention, the user preference information may includes a plurality of preference items and the information is preferably broadcast program transmitted from broadcast stations.

According to the present invention, it becomes very easy to find out favorite programs among a large number of broadcast programs using regularly transmitted EPG data.

Here in below, preferred embodiments of this invention are explained in detail with reference to drawings. Namely, the examples described here in after are the best mode of embodiments of this invention, therefore there are technically suitable various limitations, but the scope of this invention is not affected by these limitations unless there is a description about restriction of this invention in the explanation below.

DETAILED DESCRIPTION OF THE PREFERRED EMBODIMENTS

1) A Basic Concept of an Analog Type of a Ground Wave Broadcast System

Figure 1:
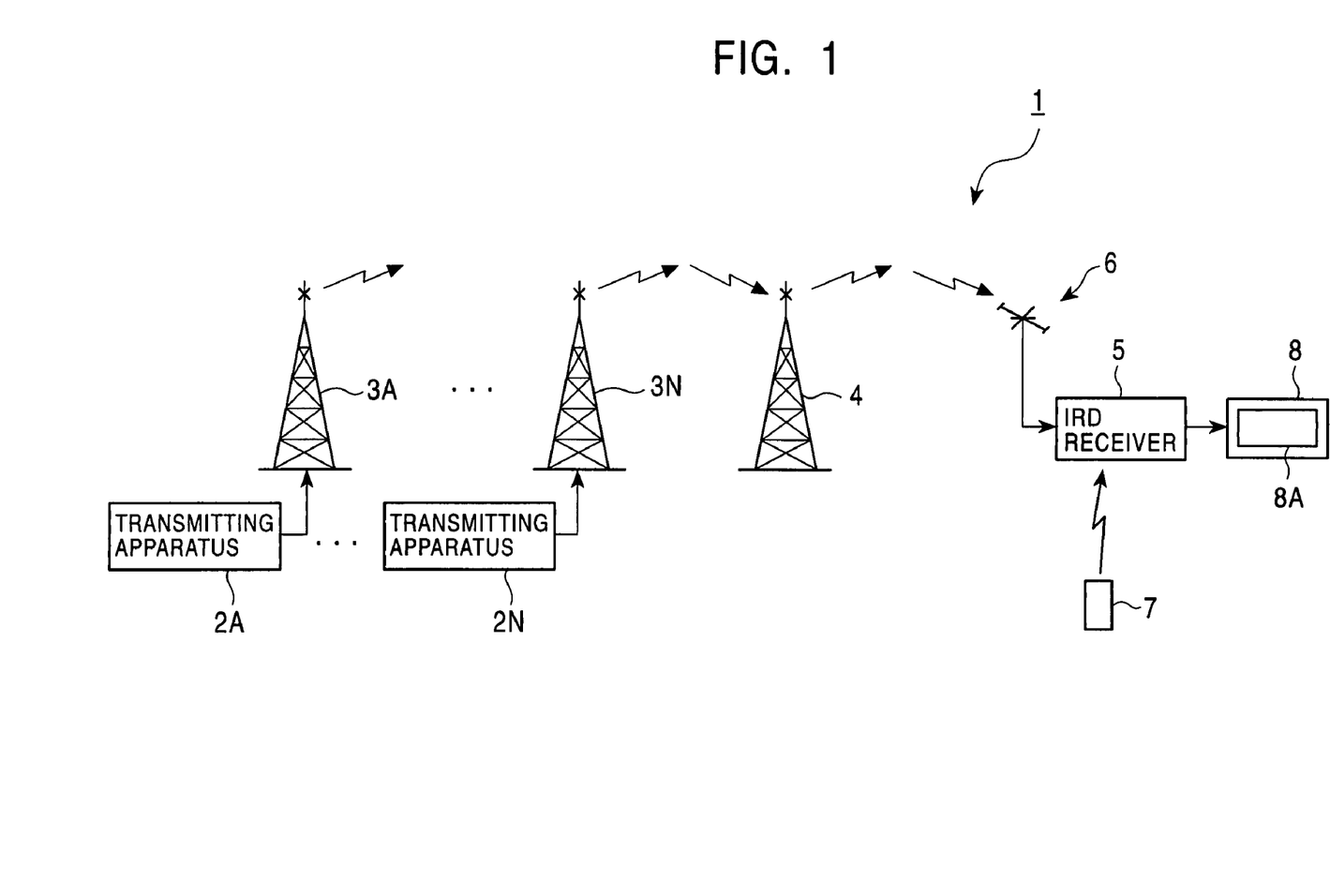
FIG. 1 is a block diagram showing a basic concept of an analog type of a ground wave broadcasting system.

In FIG. 1, a reference numeral 1 shows a basic concept of an analog type of a ground wave broadcast system as a whole, and each transmitting apparatus 2A to 2N inclusive of respective broadcast stations transmits a video signal and an audio signal of a broadcast program from transmitting antennas 3A to 3N inclusive. A repeater station 4 relays broadcast waves transmitted from the transmitting apparatus 2A to 2N, and delivers the broadcast waves to an IRD (Integrated Receiver and Decoder) receiver 5 installed in each of TV viewer (listener)'s home.

The IRD receiver 5 receives the broadcast waves from a plurality of broadcast stations at a receiving antenna 6, and a viewer (listener) selects favorite broadcast program by a remote commander 7 among received broadcast programs from the broadcast stations. Thus selected broadcast program is demodulated and displayed on a display screen 8A of a monitor 8.

2) A Construction of the IRD Receiver 5

Figure 2:
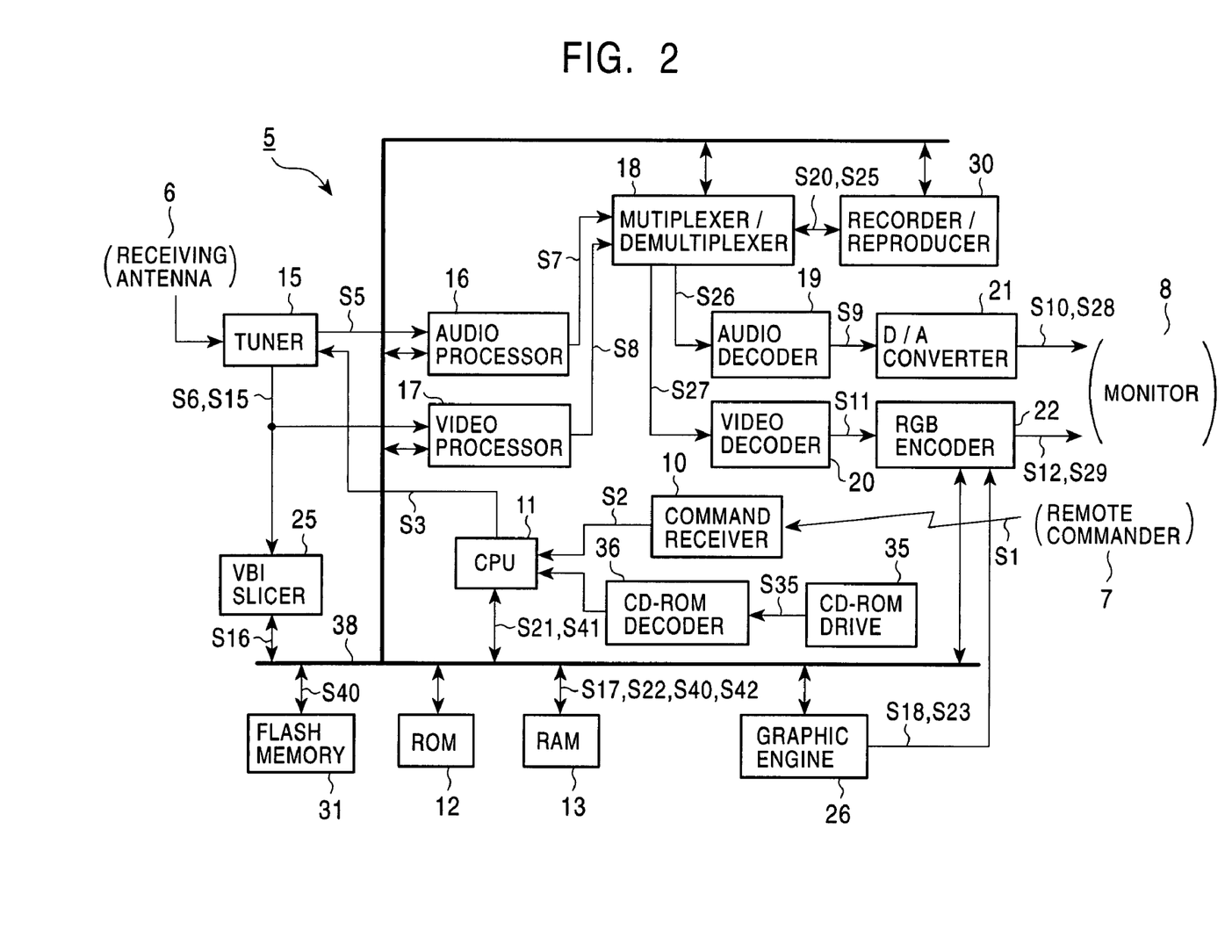
FIG. 2 is a block diagram showing one embodiment of an IRD receiver to which the present invention is applied.

As shown in FIG. 2, the IRD receiver 5 receives an infra-red command signal S1 superimposed on an infra-red carrier transmitted from the remote commander 7 (FIG. 1) at a command receiver 10. Thus received infra-red command signal S1 is converted into an electrical command signal S2 and then this electrical command signal S2 is supplied to a CPU (Central Processing Unit) 11.

The CPU 11 reads out a control program stored in a ROM (Read Only Memory) 12, and thus read out control program is transferred to a RAM (Random Access Memory) 13. The CPU 11 executes the control program stored in the RAM 13 to control all operation of circuits of the IRD receiver 5.

The CPU 11 then analyzes the electrical command signal S2 supplied from the command receiver 10 of the IRD receiver 5, and if channel selecting operation is done by the viewer (listener) through the remote commander 7 (FIG. 1), the CPU 11 generates a channel selection signal S3 according to the channel selecting operation of the viewer (listener) and supplies this channel selection signal S3 to a tuner 15.

The tuner 15 selects a broadcast wave of the selected channel or the broadcast station among broadcast waves received by the receiving antenna 6 (FIG. 1) in accordance with the channel selection signal S3. The tuner 15 then generates an audio signal S5 and a video signal S6 by demodulating the broadcast wave of the selected channel and supplies these audio signal S5 and video signal S6 to an audio processor 16 and a video processor 17, respectively.

The audio processor 16 converts the audio signal S5 into a coded audio data S7 by a compression coding based on the MPEG (Moving Picture Experts Group) format after analog to digital conversion. Thus obtained coded audio data S7 is then supplied to an audio decoder 19 by way of a multiplexer/demultiplexer 18.

On the contrary, the video processor 17 converts the video signal S6 into a coded video data S8 by a compression coding based on the MPEG format after analog to digital conversion. Thus obtained coded video data S8 is then supplied to an video decoder 20 by way of the multiplexer/demultiplexer 18.

Further an audio decoder 19 decompresses and demodulates the coded audio data S7 and generates an audio data S9. This audio data S9 is supplied to a D/A (Digital to Analog) converter 21, and an audio signal S10 from the D/A converter 21 is then supplied to the monitor 8 (FIG. 1).

On the contrary, a video decoder 20 decompresses and demodulates the coded video data S8 and generates a video data S11. This video data S11 is supplied to a RGB (red, green and blue) encoder 22. The RGB encoder 22 encodes the supplied video data S11 into a luminance signal and a chrominance signal of the NTSC (National Television System Committee) standard, and then generates a video signal S12 to be supplied to the monitor 8 (FIG. 1).

Thus video images of the broadcast program selected by the viewer (listener) is displayed on the display screen 8A of the monitor 8 and an audio sound of the broadcast program selected by the viewer (listener) is outputted from a speaker (not shown) of the monitor 8.

By the way, in the analog type of a ground wave broadcast system, predetermined one of broadcast stations delivers electronic broadcast program guide information for all broadcast stations. This electronic broadcast program guide information is called as an EPG (Electronic Program Guide) data and is delivered regularly once a week or month, for example. This EPG data is generated relating to each of broadcast programs of all broadcast stations.

Figure 3:
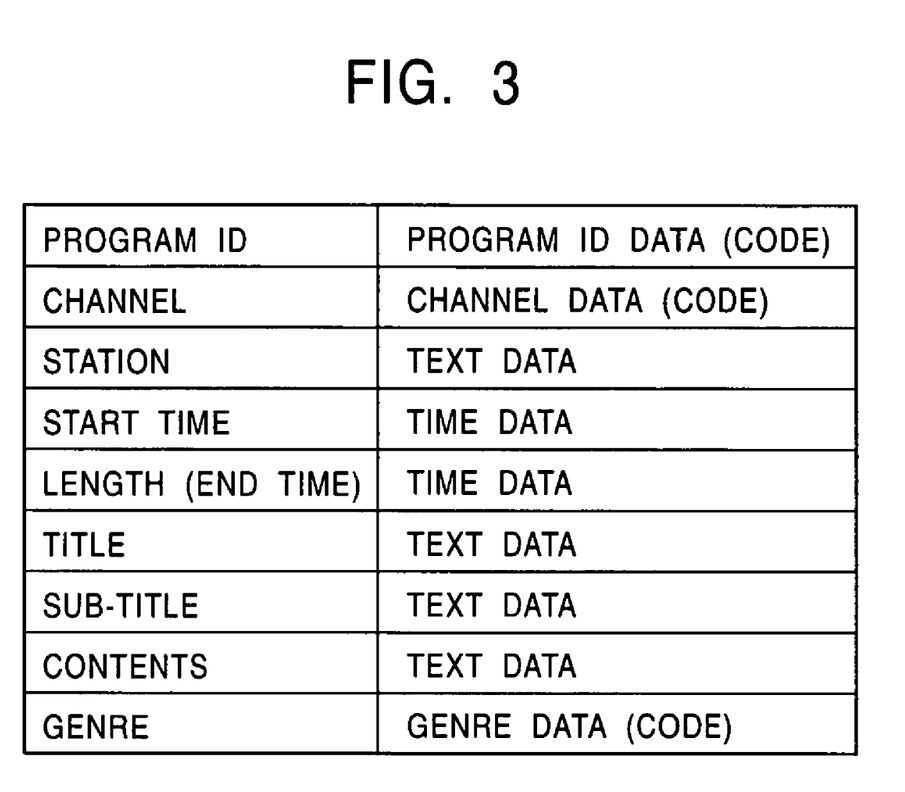
FIG. 3 is a data table showing one example of contents of an EPG data to be received by the IRD receiver.

The EPG data includes, as shown in FIG. 3, a broadcast program ID (Identification) inherent to each broadcast program, a channel number of the broadcast program, a name of the broadcast station, a start time of the broadcast program, a length of a broadcast program, a title of the broadcast program, a sub-title of the broadcast program, detailed contents of the broadcast program and a genre of the broadcast program or the like. The viewer (listener) decides a favorite one of broadcast programs to watch based on this EPG data displayed on the display screen 8A of the monitor 8.

In this case, the broadcast program ID, the channel number and the genre are expressed by code data, and the station name, the title of the broadcast program, the sub-title of the broadcast program and the contents are expressed by text data. The start time and the length of the broadcast program are time data.

The transmitting apparatus (2A in FIG. 1, for example) installed in the predetermined broadcast station transmits the EPG data for one week in a superimposed form in the VBI (Vertical Blanking Interval) of the video signal regularly once a day during mid-night or early in the morning.

In this case, the tuner 5 of the IRD receiver 5 picks up the broadcast wave on which the EPG data are superimposed among broadcast waves received by the receiving antenna 6. Further the tuner 5 demodulates thus picked up broadcast wave and generates a video signal S15 that is supplied to a VBI slicer 25. The VBI slicer 25 extracts an EPG data S16 from the video signal S15 and this EPG data S16 is supplied to a RAM 13 through a bus 38. Thus the IRD receiver 5 revises the EPG data S16 stored in the RAM 13 every day, and the latest EPG data S16 is always stored in the RAM 13.

The IRD receiver 5 may receive the broadcast wave in accordance with the broadcast schedule. The IRD receiver 5 has a timer and a control circuit to control the tuner in accordance with the schedule. The schedule information is stored in a memory, and the stored information may be regularly replaced into a received schedule.

When the viewer (listener) operates the remote commander 7 to display an EPG image, the remote commander 7 transmits the infra-red command signal S1 to the command receiver 10. The command receiver 10 converts the received infra-red command signal S1 into the electrical command signal S2 and supplies this electrical command signal S2 to the CPU 11. When the CPU 11 receives the electrical command signal S2 from the command receiver 10, the CPU 11 starts to apply a graphic processing to the EPG data S16 on the RAM 13 based on a dictionary data such as characters and marks stored in the ROM 12, and generates an EPG image data S17. This EPG image data S17 is supplied to the graphic engine 26 by way of the bus 38.

The graphic engine 26 converts the EPG image data S17 into a luminance signal and a chrominance signal of the NTSC standard and generates an EPG video signal S18 by applying a digital to analog conversion. The EPG video signal S18 is then supplied to the RGB encoder 22. The RGB encoder 22 superimposes the EPG video signal S18 on a video signal S11 and supplies video signal S12 to the monitor 8. Accordingly an EPG image corresponding to the EPG video signal S18 is displayed on the display screen 8A of the monitor 8.

By the way, when the viewer (listener) operates the remote commander 7 for recording audio and video signals of the selected broadcast program, the remote commander 7 transmits the infra-red command signal S1 for recording to the command receiver 10. The command receiver 10 converts the infra-red command signal S1 into the electrical command signal S2 and supplies this electrical command signal S2 to the CPU 11.

When the CPU 11 receives the electrical command signal S2 for recording broadcast program selected by the remote commander 7, the CPU 11 controls proper circuits of the IRD receiver 5 for recording the audio and video signals of the broadcast program through the bus 38. Namely, the multiplexer/demultiplexer 18 multiplexes the coded audio data S7 and the coded video data S8 and generates a multiplexed data S20. Thus generated multiplexed data S20 is supplied to the recorder/reproducer 30 for recording on a recording medium (not shown) such as magnetic recording medium, an optical recording medium and so on.

When the recording time for the broadcast program selected by the viewer (listener) is over, the CPU 11 generates a recording title list data S21 based on the EPG data S16 previously stored in the RAM 13 and stores this recording title list in the flash memory 31. In this case, the recording title list data S21 generally includes title list of the broadcast programs recorded at the recorder/reproducer 30.

The CPU 11 revises the recording title list data S21 at each time when a new broadcast program is recorded at the recorder/reproducer 30, so that the latest recording title list data S21 is always stored in the flash memory 31.

In this case when the viewer (listener) operates the remote commander 7 to display a recording title list image, the remote commander 7 transmits the infra-red command signal S1 for displaying the recording title list image to the command receiver 10. The command receiver 10 converts the infra-red command signal S1 into electrical command signal S2 and supplies this electrical command signal S2 to the CPU 11. When the CPU 11 receives this electrical command signal S2, the CPU 11 reads out the recording title list data S21 from the flash memory 31 and supplies thus read out recording title list data S21 to the RAM 13.

The CPU 11 then applies a graphic processing to the recording title list data S21 on the RAM 13 based on the dictionary data such as characters and marks stored in the ROM 12, and generates a recording title list image data S22. This recording title list image data S22 is supplied to the graphic engine 26 by way of the bus 38.

The graphic engine 26 converts thus supplied recording title list image data S22 into a luminance signal and a chrominance signal of the NTSC standard and generates a recording title list video signal S23 by applying a digital to analog conversion. The recording title list video signal S23 is then supplied to the RGB encoder 22. The RGB encoder 22 superimposes the recording title list video signal S23 on the video signal S11 and supplies video signal S12 to the monitor 8. Accordingly a recording title list image corresponding to the recording title list video signal S23 is displayed on the display screen 8A of the monitor 8.

The viewer (listener) checks the recording title list displayed on the display screen 8A of the monitor 8 and operates the remote commander 7 to reproduce favorite broadcast program previously recorded on the recording medium by the recorder/reproducer 30. Then the remote commander 7 transmits the infra-red command signal S1 for reproduction to the command receiver 10. The command receiver 10 converts the received infra-red command signal S1 into the electrical command signal S2 and supplies this electrical command signal S2 to the CPU 11.

When the CPU 11 receives this electrical command signal S2 for reproduction selected by the remote commander 7, the CPU 11 controls proper circuits of the IRD receiver 5 for reproducing the audio and video signals of the broadcast program selected through the bus 38. Namely, the recorder/reproducer 30 reproduces a multiplexed data S25 of the designated broadcast program among a plurality of multiplexed data for broadcast programs recorded on the recording medium at the recorder/reproducer 30. The multiplexed data S25 is then supplied to the multiplexer/demultiplexer 18, wherein the multiplexed data S25 is demultiplexed into the coded audio data S26 and the coded video data S27, respectively.

Further the audio decoder 19 decompresses and demodulates the coded audio data S26 and supplies to the D/A (Digital to Analog) converter 21 which generates an audio signal S28, and this audio signal S21 is then supplied to the monitor 8 (FIG. 1). The video decoder 20 decompresses and demodulates the coded video data S27 and supplies to the RGB (red, green and blue) encoder 22. The RGB encoder 22 encodes decompressed and demodulated coded video data S27 into a luminance signal and a chrominance signal of the NTSC (National Television System Committee) standard, and generates a video signal S29 to be supplied to the monitor 8 (FIG. 1).

A CD-ROM (Compact Disc Read Only Memory) drive 35 reads out data for broadcast program logo and pictures of personalities relating to a regular broadcast program from a specially made CD-ROM and supplies these read out data to a CD-ROM decoder 36. The CD-ROM decoder 36 decodes these data as broadcast program imagination data S35 and the CPU 11 supplies the broadcast program imagination data S35 to the flash memory 31 for storing.

By the way, in the case of this embodiment, the IRD receiver 5 registers broadcast program preference information of the viewer (listener) about broadcast programs in advance. The CPU 11 generates an EPG image capable of displaying viewer (listener)'s program preference information based on previously registered program preference information.

Figure 4:
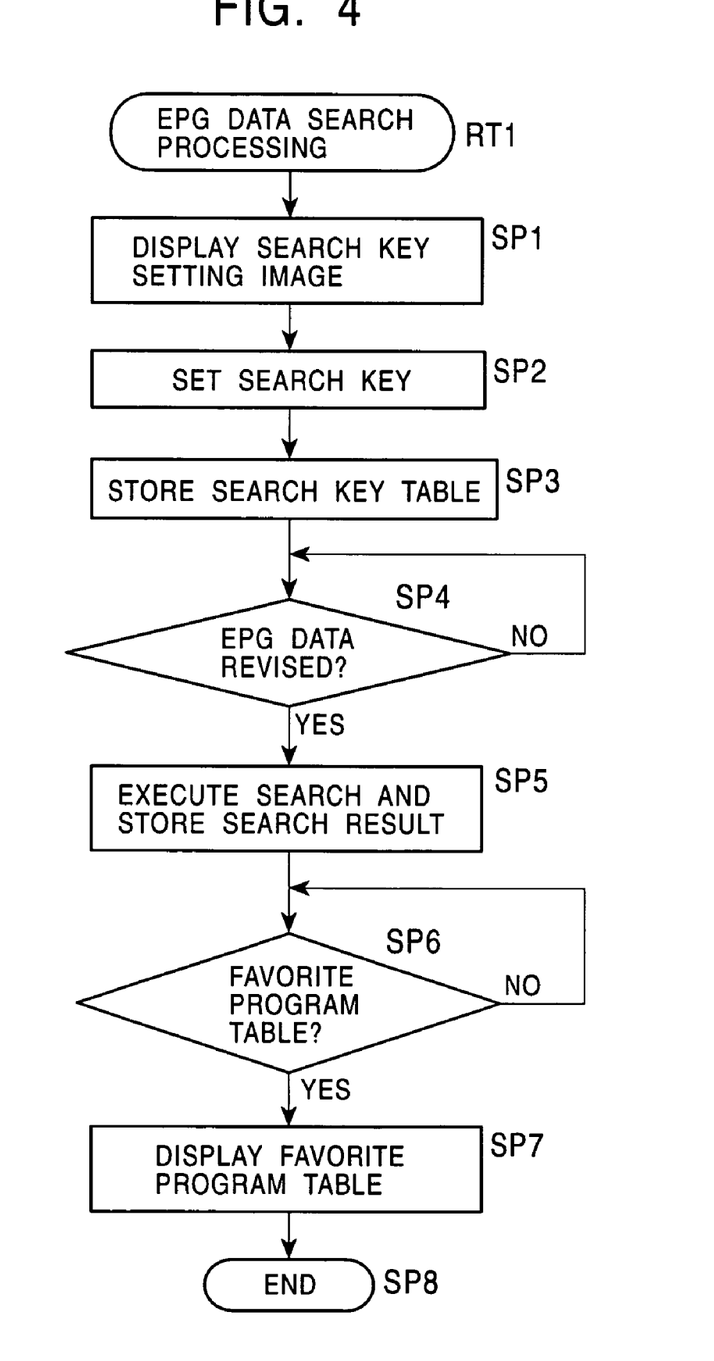
FIG. 4 is a flowchart for the EPG data search processing done in the IRD receiver.

Namely, when the viewer (listener) operates a key for an EPG data search key setting image, the CPU 11 of the IRD receiver 5 execute an EPG data search processing RTI for the EPG data S16 as shown in FIG. 4. Then the CPU 11 moves the processing to a step S1 and generates an EPG data search key setting image data S40 based on the control program stored in the RAM 13.

Figure 5:
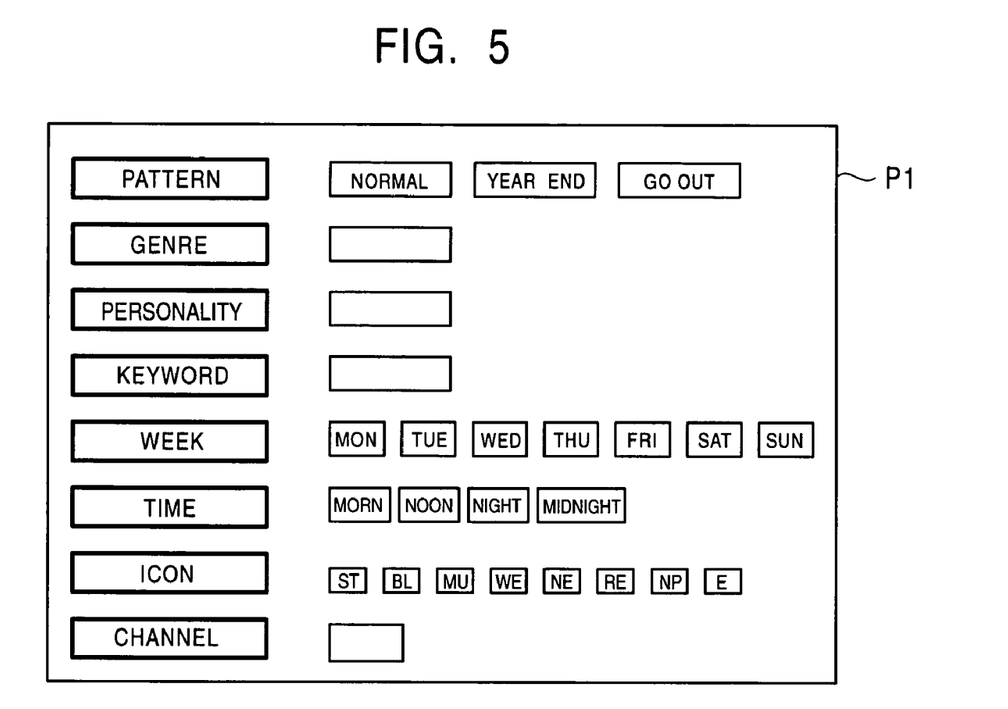
FIGS. 5 & 6 are EPG data search key setting images displayed on a display screen of a monitor of the IRD receiver.

After that, the CPU 11 supplies thus generated EPG data search key setting image data S40 to the monitor 8 by way of the graphic engine 26 and the RGB encoder 22. The monitor 8 displays an EPG data search key setting image P1 on its display screen 8A as shown in FIG. 5. The viewer (listener) is able to set search key (program preference information) for searching favorite broadcast program among a large number of broadcast programs included in the EPG data S16 using this EPG data search key setting image P1. As a search key namely as a program preference information, the viewer (listener) can set a registration pattern, a genre, personalities, keywords, week, time, icons for broadcast mode and channel using the remote commander 7.

There are provided a "Normal" pattern for setting search key usually, a "Year end" pattern for setting search key at the end of the year and a "Go out" pattern for setting search key upon going out from home as registration patterns, and the viewer (listener) selects one of these three patterns and enters the search key relating to the selected registration pattern.

Figure 6:
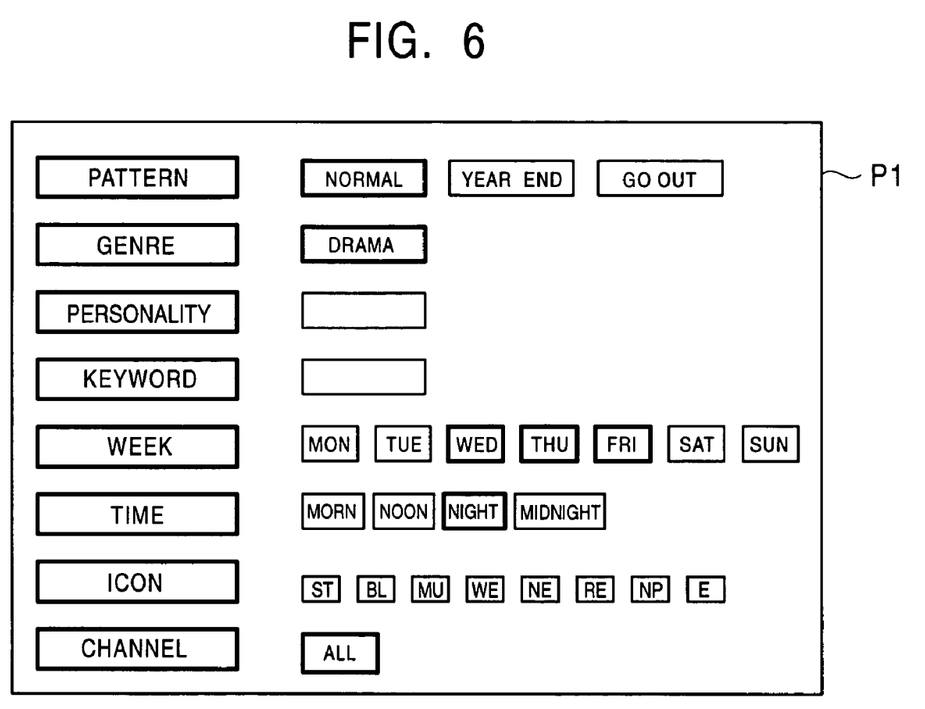

Then the CPU 11 moves the processing to a step SP2. In this case when the viewer (listener) operates the remote commander 7 to set various search key using the EPG data search key setting image P1, the CPU 11 accepts "Normal" for registration pattern, "Drama" for a genre, "Wednesday, Thursday and Friday" for the day of the week, "Night" for the time and "All" for the channel as shown in FIG. 6. Similarly, search key for "Year end" pattern and "Go out" pattern are able to be accepted upon request.

Figure 7:
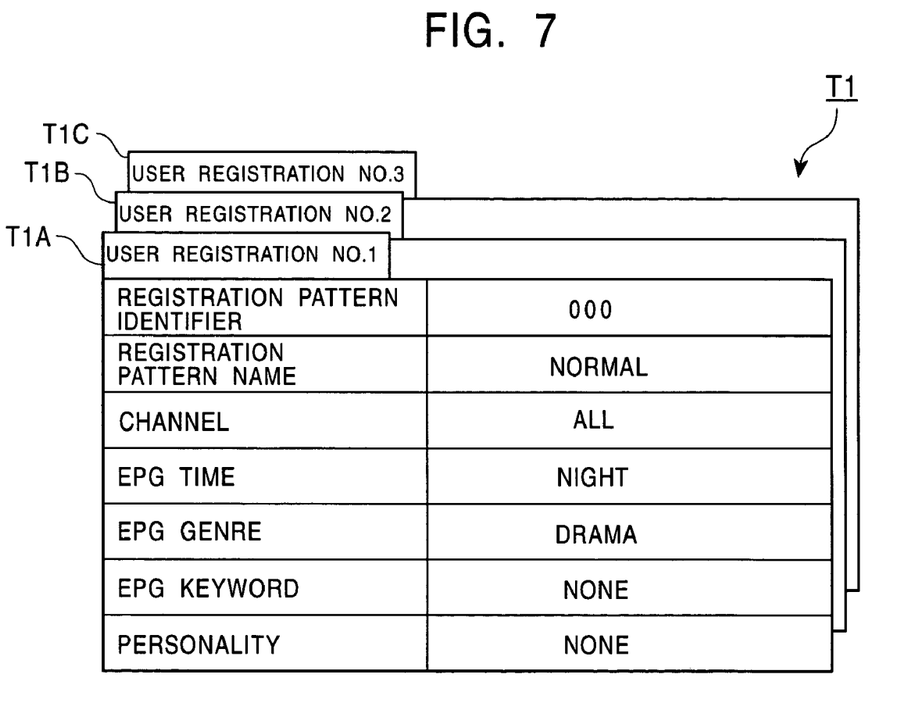
FIG. 7 is a table showing contents of a search key table.

The CPU 11 then generates a search key table TI for each registration pattern as shown in FIG. 7, and stores this search key table data S41 into the flash memory 31.

In this case, a search key for the "Normal" pattern is assigned to a search key table T1A of a user registration No. 1 and a registration pattern identifier [000] is allocated to this search key table T1A. Similarly, a search key for the "Year end" pattern is assigned to a search key table T1B of a user registration No. 2 and a registration pattern identifier [001] is allocated to this search key table T1B, and further a search key for the "Go out" pattern is assigned to a search key table T1C of a user registration No. 3 and a registration pattern identifier [010] is allocated to this search key table T1C, respectively.

Then the CPU 11 moves the processing to a step SP4, and detects the reception of the EPG data and waits until the EPG data S16 stored in the flash memory 13 is revised by a newly received EPG data.

If the EPG data S16 stored in the flash memory 13 is revised, the CPU 11 moves the processing to a step SP5. At this step SP5, the CPU 11 searches a broadcast program coincided with the contents of the search key table T1A among a large number of broadcast programs included in the EPG data S16 stored in the flash memory 13 based on the search key table T1A for the "Normal" pattern. If it is necessary, the CPU 11 searches broadcast programs coincided with the search key table T1B for the "Year end" pattern or broadcast programs coincided with the search key table T1C for the "Go out" pattern.

Then the CPU 11 stores each search result done based on the search key tables T1A, T1B and T1C of each registration pattern in the RAM 13 as a EPG search data. In this condition, the CPU 11 moves the processing to a step SP6, wherein the CPU 11 waits until the viewer (listener) pushes a favorite broadcast program table display key (not shown) using the remote commander 7.

Figure 8:
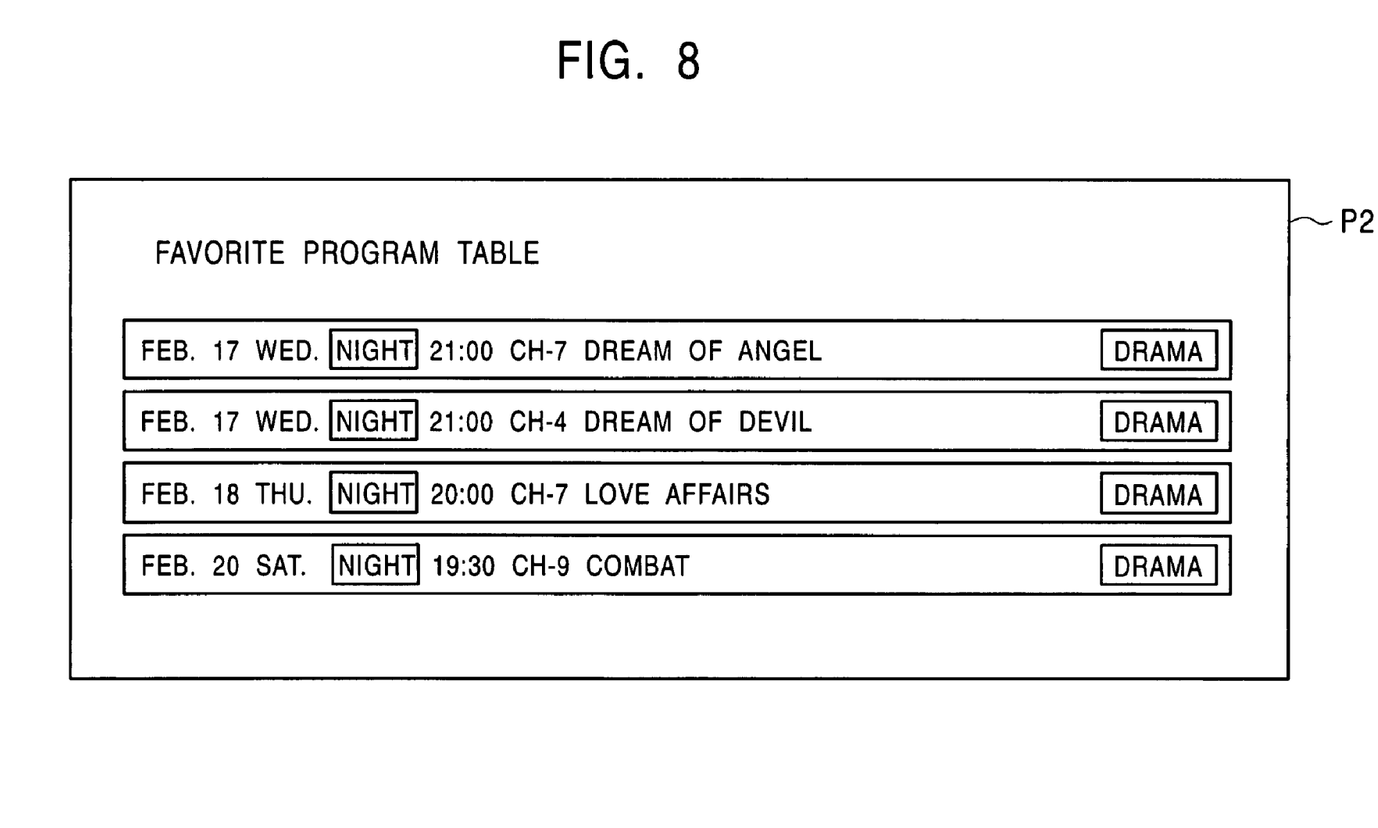
FIG. 8 is one example of a favorite broadcast program table.

When the favorite broadcast program table display key is pushed, the CPU 11 moves the processing to a step SP7 and generates an EPG search image data S42 from the EPG search data corresponding to the designated registration pattern. The CPU 11 then supplies thus generated EPG search image data S42 to the monitor 8 by way of the graphic engine 26 and the RGB encoder 22. Accordingly, The CPU 11 displays the favorite broadcast program table coincided with the preference of the viewer (listener) on the display screen 8A of the monitor 8 as shown in FIG. 8 and moves the processing to a step SP8 to quit.

The operation of the above described embodiment is explained as follows. Namely, when the viewer (listener) enters the program preference information from the remote commander 7, the CPU 11 stores thus entered program preference information of the viewer (listener) into the flash memory 31. In this condition, if the CPU 11 detects the revision of the EPG data S16 stored in the flash memory 31, the CPU 11 searches a broadcast program coincided with the program preference information of the viewer (listener) among a large number of broadcast programs included in the EPG data S16 and stores the search result into the RAM 13 as the EPG search data.

Then if the viewer (listener) operates the remote commander 7 in order to display the preference broadcast program table, the CPU 11 displays a list of broadcast program coincided with the preference of the viewer (listener) on the display screen 8A of the monitor 8 based on the EPG search data stored in the RAM 13.

Thus the search for the EPG data S16 is done based on previously registered program preference information at every time when the EPG data S16 is revised. Accordingly it is not necessary to set again the search key and to execute the search at every time when the EPG data S16 is revised.

In this case, the IRD receiver 5 accepts registration for a plurality of preference items as a program preference information, so that the viewer (listener) is able to search broadcast programs exactly coincided with the preference of the viewer (listener).

In the above described embodiment, as a search key namely as a program preference information, the viewer (listener) can set a registration pattern, genre, personalities, keywords, date, time, icons for broadcast mode and channel using the remote commander 7, but the other search key such as scenarists or other items may be combined to the search key upon searching the EPG data S16.

Further in the above described embodiment, the CPU displays a favorite broadcast program list on the display screen 8A of the monitor 8, but it is possible to set timer setting for watching automatically based on the search result.

Further the list of broadcast program table is displayed on the display screen 8A of the monitor 8 in the above described embodiment, but a headline information for the broadcast program is able to be displayed on the display screen 8A of the monitor 8 if it is required.

This invention is applied not only to the IRD receiver 5 of analog type of a ground wave broadcast system but also to a receiver for a digital broadcast satellite system or a cable broadcast system, and so on.

While we have described and shown the particular embodiments of our invention, it will be understood that many modifications may be made without departing from the spirit thereof, and we contemplate by the appended claims to cover any modifications as fall within the true spirit and scope of our invention.

What is claimed is:

1. An information receiving apparatus for receiving headline information related to information, comprising:
    memory means for storing user preference information;
    means for detecting reception of a plurality of headline information related to the information;
    means for searching, based on said user preference information stored in said memory means, headline information coincided with said user preference information among received headline information at the time when the reception of said plurality of headline information is detected by said detecting means;
    means for generating a first image corresponding to the user preference information;
    means for generating a search condition setting image corresponding to a user set search condition;
    means for generating a second image corresponding to a search result; and
    means for superimposing either:
        (a) the first image, and the second image, or
        (b) the search condition setting image;
        wherein the means for superimposing superimposes (a) or (b) over a current video signal;
    wherein said user preference information includes a plurality of registration patterns,
    wherein the registration pattern is pre-selected information corresponding to an event and a timing of the event and limits the headline information that is to be searched,
    wherein one of the plurality of registration patterns is selected first by a user, preceding a selection of corresponding search criteria, and
    wherein results of searching based on said user preference information are a function of the selected registration pattern combined with the selection of corresponding search criteria.

2. An information receiving apparatus for receiving headline information related to an information as claimed in claim 1, further comprising:
    display means for displaying said headline information searched by said searching means.

3. An information receiving apparatus for receiving headline information related to an information as claimed in claim 1, further comprising:
    recording means for recording said information related to said headline information searched by said searching means.

4. An information receiving apparatus for receiving headline information related to an information as claimed in claim 1, wherein said user preference information includes a plurality of preference items.

5. An information receiving apparatus for receiving headline information related to an information as claimed in claim 1, wherein said information is broadcast program transmitted from broadcast stations.

6. A method for receiving headline information related to an information, the method comprising the steps of:
    storing user preference information;
    detecting reception of a plurality of headline information related to an information;
    searching, based on said user preference information stored at said storing step, headline information coincided with said user preference information among received headline information at the time when the reception of said plurality of headline information is detected at said detecting step;
    generating a first image corresponding to the user preference information;
    generating a search condition setting image corresponding to a user set search condition;
    generating a second image corresponding to a search result; and
    superimposing, over a current video signal, either:
        the first image and the second image or
        the search condition setting image;
    wherein said user preference information includes a plurality of registration patterns, wherein each registration pattern is pre-selected information corresponding to an event and a timing of the event and,
    limiting the headline information that is to be searched,
    wherein one of the plurality of registration patterns is selected first by a user, preceding a selection of corresponding search criteria, and
    wherein results of searching based on said user preference information are a function of the selected registration pattern combined with the selection of corresponding search criteria.

7. A method for receiving headline information related to an information as claimed in claim 6, further comprising:
    displaying said headline information searched at said searching step.

8. A method for receiving headline information related to an information as claimed in claim 6, further comprising:
    recording said information related to said headline information searched at said searching step.

9. A method for receiving headline information related to an information as claimed in claim 6, wherein said user preference information includes a plurality of preference items.

10. A method for receiving headline information related to an information as claimed in claim 6, wherein said information is broadcast program transmitted from broadcast stations.

11. A program information receiving apparatus for receiving an Electronic Program Guide (EPG) information, comprising:
    remote commander means;
    memory means for storing user preference information entered from said remote commander means;
    means for detecting reception of a plurality of headline information related to an information; and
    means for searching, based on said user preference information stored in said memory means, headline information coincided with said user preference information among received headline information at the time when the reception of said plurality of headline information is detected by said detecting means;
    means for generating a first image corresponding to the user preference information;

means for generating a search condition setting image corresponding to a user set search condition;
means for generating a second image corresponding to a search result;
means for superimposing, over a current video signal, either:
the first image and the second image or
the search condition setting image;
wherein said user preference information includes a plurality of registration patterns,
wherein the registration pattern is pre-selected information corresponding to an event and a timing of the event and limits the headline information that is to be searched,
wherein one of the plurality of registration patterns is selected first by a user, preceding a selection of corresponding search criteria, and
wherein the results of searching based on said user preference information are a function of the selected registration pattern combined with the selection of corresponding search criteria.

12. An information receiving apparatus for receiving headline information related to information, comprising:
a memory unit that stores user preference information;
a detection unit that detects reception of a plurality of headline information related to the information;
a searching unit that searches, based on said user preference information stored in said memory unit, headline information coincided with said user preference information among received headline information at the time when the reception of said plurality of headline information is detected by said detection unit;
a first image generating unit that generates a first image corresponding to the user preference information;
a search condition setting image unit that generates a search condition setting image corresponding to a user set search condition;
a second image generating unit that generates a second image corresponding to a search result; and
a superimposing unit that superimposes, over a current video signal, either:
the first image and the second image or
the search condition setting image;
wherein said user preference information includes a plurality of registration patterns,
wherein the registration pattern is pre-selected information corresponding to an event and a timing of the event and limits the headline information that is to be searched,
wherein one of the plurality of registration patterns is selected first by a user, preceding a selection of corresponding search criteria, and
wherein results of searching based on said user preference information are a function of the selected registration pattern combined with the selection of corresponding search criteria.

13. A program information receiving apparatus for receiving Electronic Program Guide (EPG) information, comprising:
a remote commander unit;
a memory unit that stores user preference information entered from said remote commander unit;
a detection unit that detects reception of a plurality of headline information related to an information;
a searching unit that searches, based on said user preference information stored in said memory unit, headline information coincided with said user preference information among received headline information at the time when the reception of said plurality of headline information is detected by said detection unit;
a first image generating unit that generates a first image corresponding to the user preference information;
a search condition setting image unit that generates a search condition setting image corresponding to a user set search condition;
a second image generating unit that generates a second image corresponding to a search result;
a superimposing unit that superimposes, over a current video signal, either:
the first image and the second image or
the search condition setting image;
wherein said user preference information includes a plurality of registration patterns,
wherein the registration pattern is pre-selected information corresponding to an event and a timing of the event and limits the headline information that is to be searched,
wherein one of the plurality of registration patterns is selected first by a user, preceding a selection of corresponding search criteria, and
wherein the results of searching based on said user preference information are a function of the selected registration pattern combined with the selection of corresponding search criteria.

* * * * *